US008096758B2

(12) United States Patent
Schiavo

(10) Patent No.: US 8,096,758 B2
(45) Date of Patent: Jan. 17, 2012

(54) CIRCUMFERENTIAL SHROUD INSERTS FOR A GAS TURBINE VANE PLATFORM

(75) Inventor: Anthony L. Schiavo, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 805 days.

(21) Appl. No.: 12/203,397

(22) Filed: Sep. 3, 2008

(65) Prior Publication Data

US 2010/0054932 A1 Mar. 4, 2010

(51) Int. Cl.

| | |
|---|---|
| ***F01D 1/02*** | (2006.01) |
| ***F01D 9/00*** | (2006.01) |
| ***F03B 1/04*** | (2006.01) |
| ***F03B 3/16*** | (2006.01) |
| ***F03D 1/04*** | (2006.01) |
| ***F03D 11/00*** | (2006.01) |
| ***F03D 3/04*** | (2006.01) |
| ***F04D 29/44*** | (2006.01) |
| ***F04D 29/54*** | (2006.01) |

(52) U.S. Cl. ..................................... 415/200; 415/209.3

(58) Field of Classification Search .................. 415/200, 415/209.3

See application file for complete search history.

(56) References Cited

U.S. PATENT DOCUMENTS

| | | | |
|---|---|---|---|
| 3,583,824 | A | 6/1971 | Smuland et al. |
| 3,873,234 | A | 3/1975 | Penny |
| 4,026,659 | A | 5/1977 | Freeman, Jr. |
| 4,872,812 | A | 10/1989 | Hendley et al. |
| 5,083,903 | A | 1/1992 | Erdmann |
| 5,421,704 | A | 6/1995 | Carletti et al. |
| 5,997,245 | A | 12/1999 | Tomita et al. |
| 6,013,592 | A | 1/2000 | Merrill et al. |
| 6,287,511 | B1 | 9/2001 | Merrill et al. |
| 6,390,769 | B1 | 5/2002 | Burdgick et al. |
| 6,394,750 | B1 | 5/2002 | Hiskes |
| 6,561,764 | B1 | 5/2003 | Tiemann |
| 6,641,907 | B1 | 11/2003 | Merrill et al. |
| 6,676,783 | B1 | 1/2004 | Merrill et al. |
| 6,821,086 | B1 | 11/2004 | Brisson et al. |
| 6,830,437 | B2 | 12/2004 | Cairo et al. |
| 2004/0001753 | A1 | 1/2004 | Tiemann |
| 2005/0076504 | A1 | 4/2005 | Morrison et al. |
| 2007/0237630 | A1 | 10/2007 | Schiavo, Jr. et al. |
| 2008/0025842 | A1 | 1/2008 | Marini et al. |

*Primary Examiner* — David S Blum

(57) ABSTRACT

Protective insert plates (54, 56) installed on a working gas face (42) of a turbine vane platform (26) provide replaceable portions of a turbine shroud for improved maintenance. The plates act as tiles, and may be formed of ceramic materials for thermal protection. Two cages (58, 60) in the vane platform slidably receive the two insert plates (54, 56) from opposite circumferential sides (36, 38) of the platform. The plates slide into the cages up to the pressure and suction sides (32, 34) of the vane airfoil (22). The plates may have proximal edges (62, 64) shaped to fit the respective pressure and suction sides of the vane airfoil. A retainer plate 66 may be attached to a flange (72) on the cooled face (48) of each platform, and may contact each insert plate with a locking device (74, 76) to prevent sliding of the plate in the cage.

14 Claims, 5 Drawing Sheets

CIRCUMFERENTIAL SHROUD INSERTS FOR A GAS TURBINE VANE PLATFORM

FIELD OF THE INVENTION

The invention relates to components in the hot working gas path of a gas turbine, and particularly to turbine shroud surfaces on platforms of turbine vanes, including metal and ceramic matrix composite (CMC) surfaces.

BACKGROUND OF THE INVENTION

Gas turbines have a compressor assembly, a combustor assembly, and a turbine assembly. The compressor compresses ambient air, which is then channeled into the combustor, where it is mixed with a fuel. The fuel and compressed air mixture is ignited, creating a working gas that may reach temperatures of 2500 to 2900° F. (1371 to 1593° C.). This gas then passes through the turbine assembly. The turbine assembly has a rotating shaft holding a plurality of circular arrays or "rows" of rotating blades. The turbine assembly also has a plurality of circular arrays of stationary vanes attached to a casing of the turbine. Each row of blades is preceded by a row of vanes to direct the working gas at an optimum angle against the blades. Expansion of the working gas through the turbine assembly results in a transfer of energy from the working gas to the rotating blades, causing rotation of the shaft.

Each vane may have an outer platform connected to a radially outer end of the vane airfoil for attachment to the turbine casing, and an inner platform connected to the inner end of the vane airfoil. The outer platforms for a given row of vanes are mounted adjacent to each other as segments in a circular array, defining an outer shroud ring. The inner platforms are likewise mounted adjacent to each other in a circular array, defining an inner shroud ring. These outer and inner shroud rings define a flow channel between them that channels the working gas over the stationary airfoils.

The vane assemblies may include passages for a cooling fluid such as air. However, the surfaces of the vane assemblies exposed to the working gas are subjected to high operational temperatures and thermal stresses. This can cause cracks in the vane platforms. Typically, each vane airfoil and its two platforms are formed together as a unitary structure, so damage to a platform may require replacement of an entire vane assembly, even when the airfoil is still in a serviceable condition.

BRIEF DESCRIPTION OF THE DRAWINGS

The invention is explained in the following description in view of the drawings that show.

DETAILED DESCRIPTION OF THE INVENTION

Figure 1:
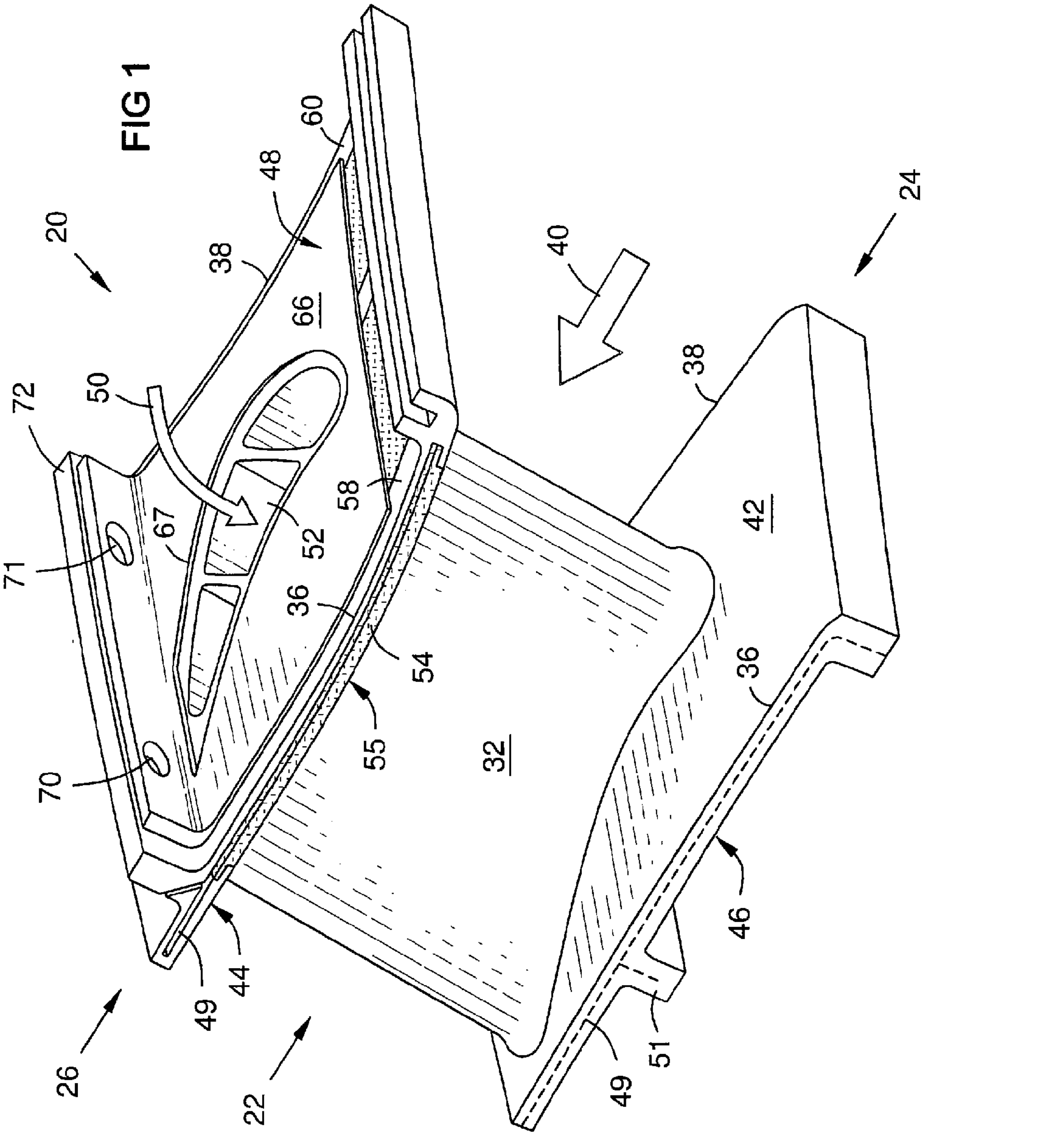
FIG. 1 is a perspective view of a turbine vane assembly according to aspects of the invention.
Figure 2:
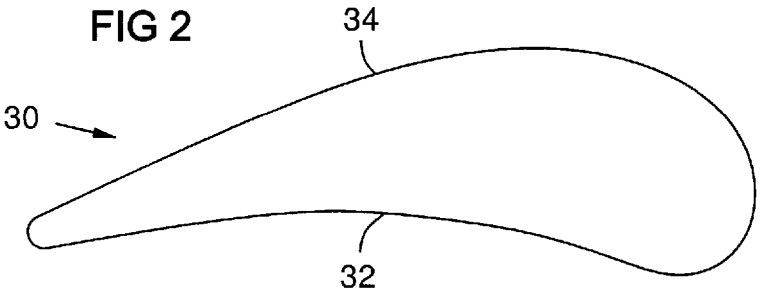
FIG. 2 illustrates geometry of a transverse section of a turbine vane.
Figure 3:
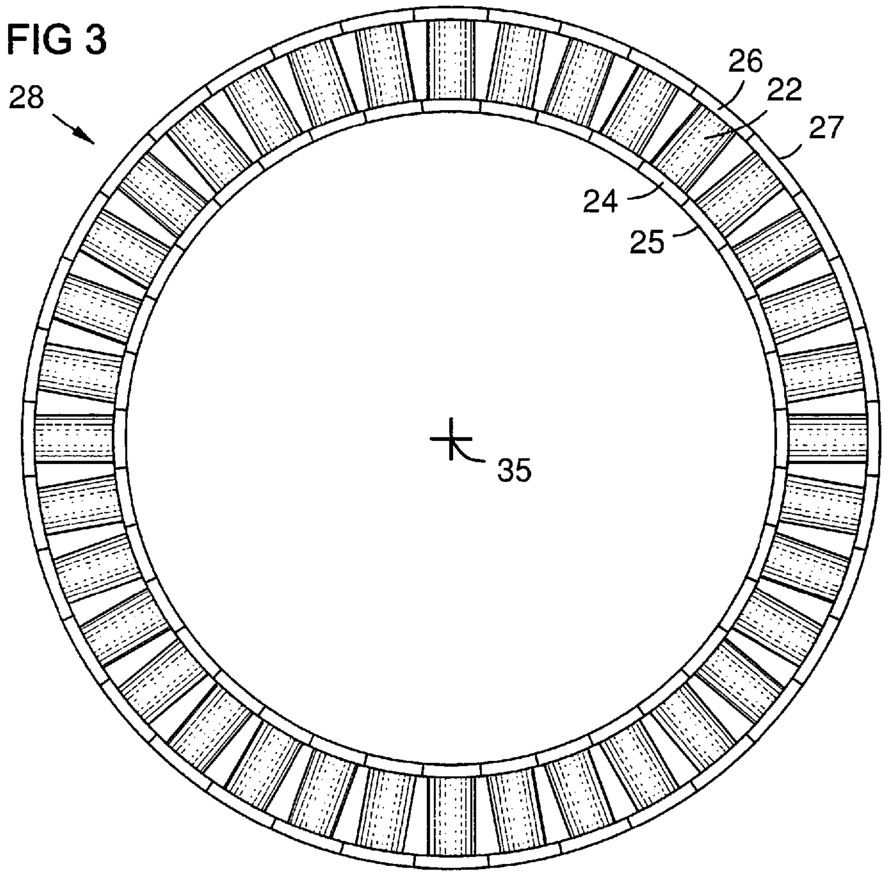
FIG. 3 illustrates a circular array of turbine vane assemblies.
Figure 6:
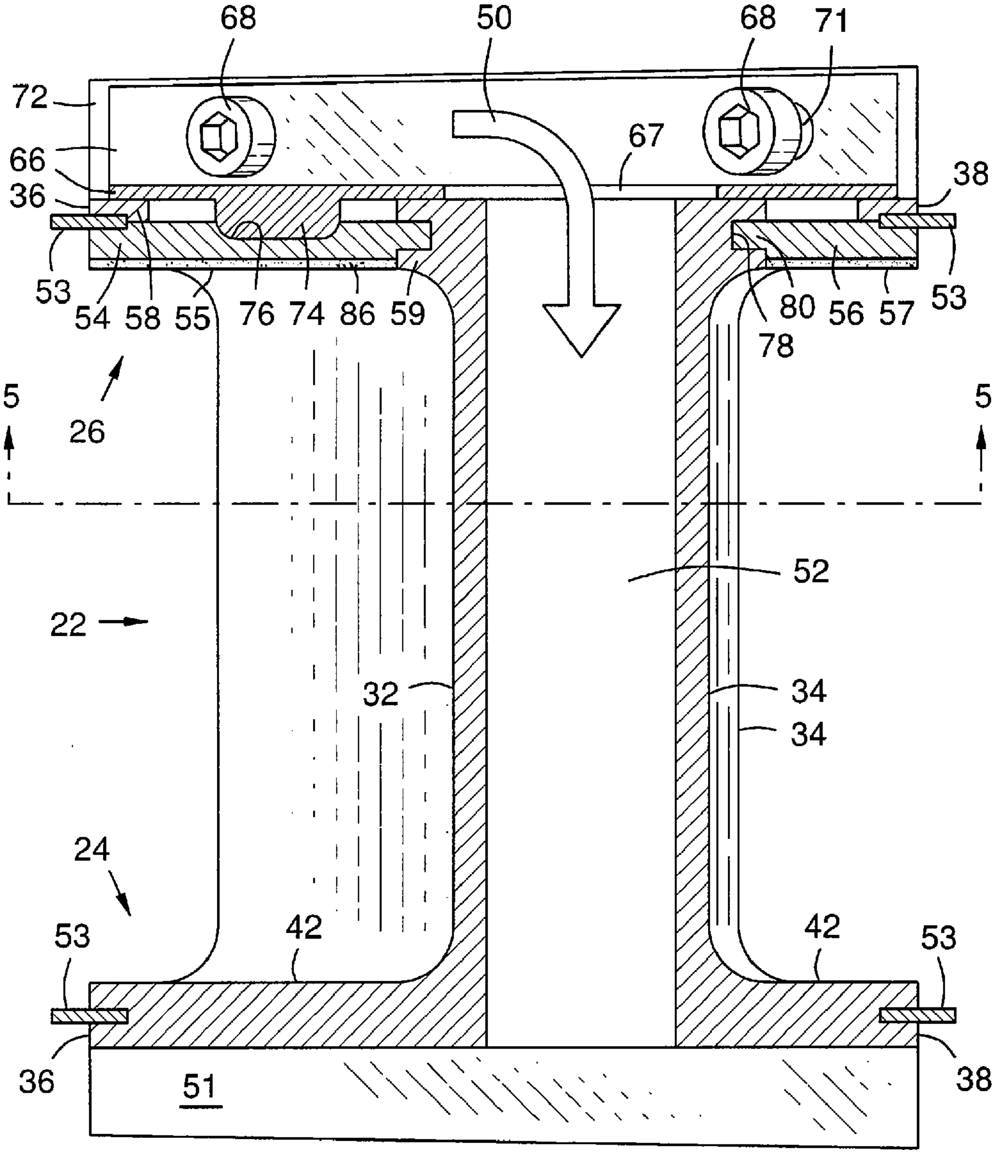
FIG. 6 is a sectional view taken along line 6-6 of FIG. 5.

FIG. 1 shows a gas turbine vane assembly 20 comprising a vane airfoil 22 with inner and outer ends attached to respective inner and outer vane platforms 24, 26. Each vane airfoil 22 has a pressure side 32 and a suction side 34. This is shown in a transverse sectional profile 30 of a vane in FIG. 2. The vane assembly 20 is installed in a circular array 28 of such vane assemblies as in FIG. 3, in which each platform 24, 26 contacts two adjacent platforms along opposite circumferential sides 36, 38 of the platform. This results in circular arrays of adjacent inner and outer platforms forming respective inner and outer shroud rings 25, 27 that channel the hot working gas 40 of the turbine between them and across the vanes 22. The outer platforms 26 may be attached to a vane carrier ring as known (not shown). Each platform has a working gas face 42, 44 and a cooled side or face 46, 48 opposite the working gas face. A coolant 50 such as air is directed to the cooled side 48 of the outer platform, and flows through channels 52 in the vane to the cooled side 46 of the inner platform 24. Seals 53 (FIG. 6) may be inserted in slots 49 the circumferential sides 36, 38 of the platforms as known in the art to seal between adjacent platforms. The inner vane platform 24 may have a boss or flange 51 for attachment to a circular inner coolant return plenum (not shown). Herein, orientation terms such as "radial", "inner", "outer", "circumferential", and the like are to be taken relative to a turbine axis 35. "Inner" means radially inner, or closer to the axis.

Figure 4:
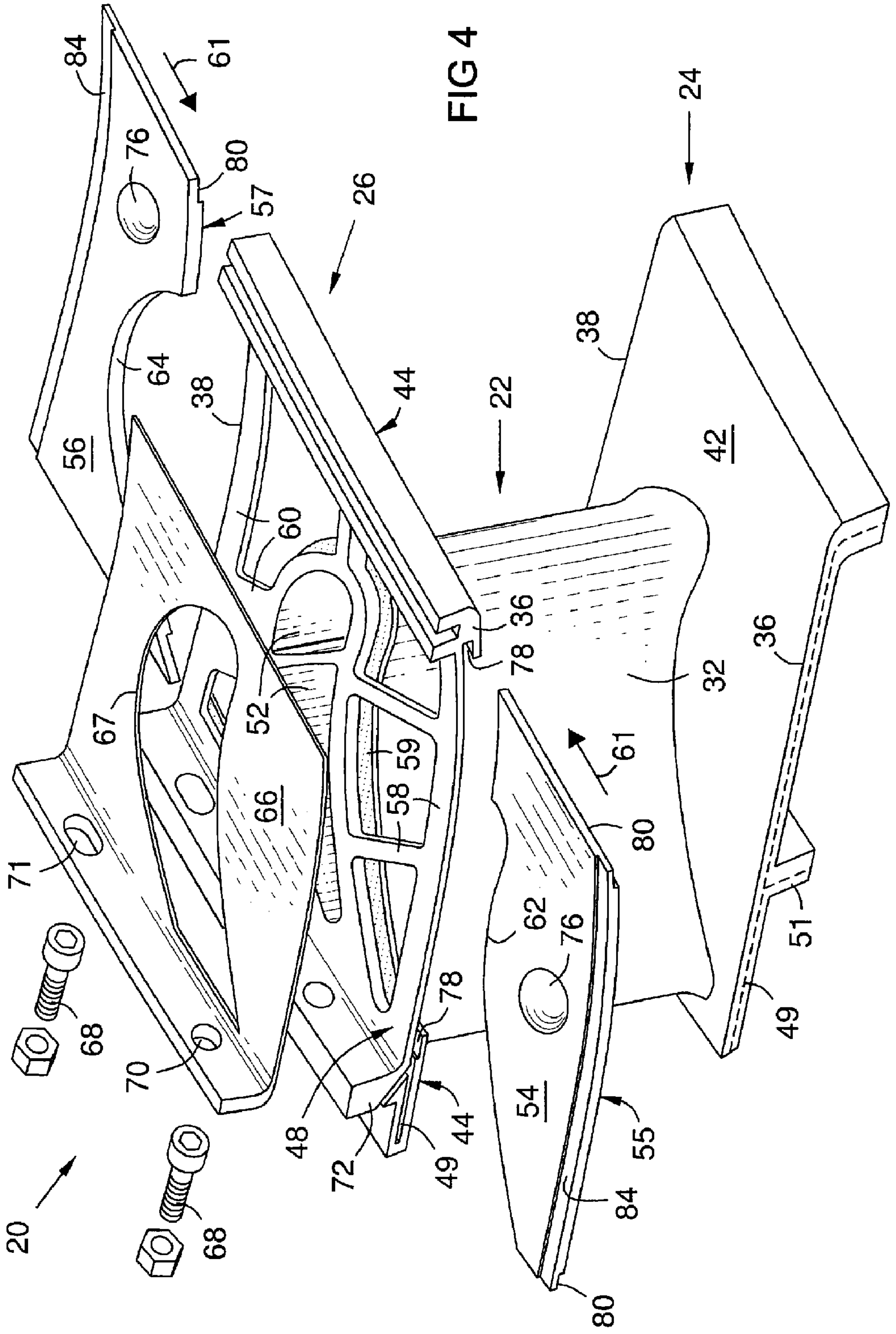
FIG. 4 is an exploded view of the turbine vane assembly of FIG. 1.
Figure 5:
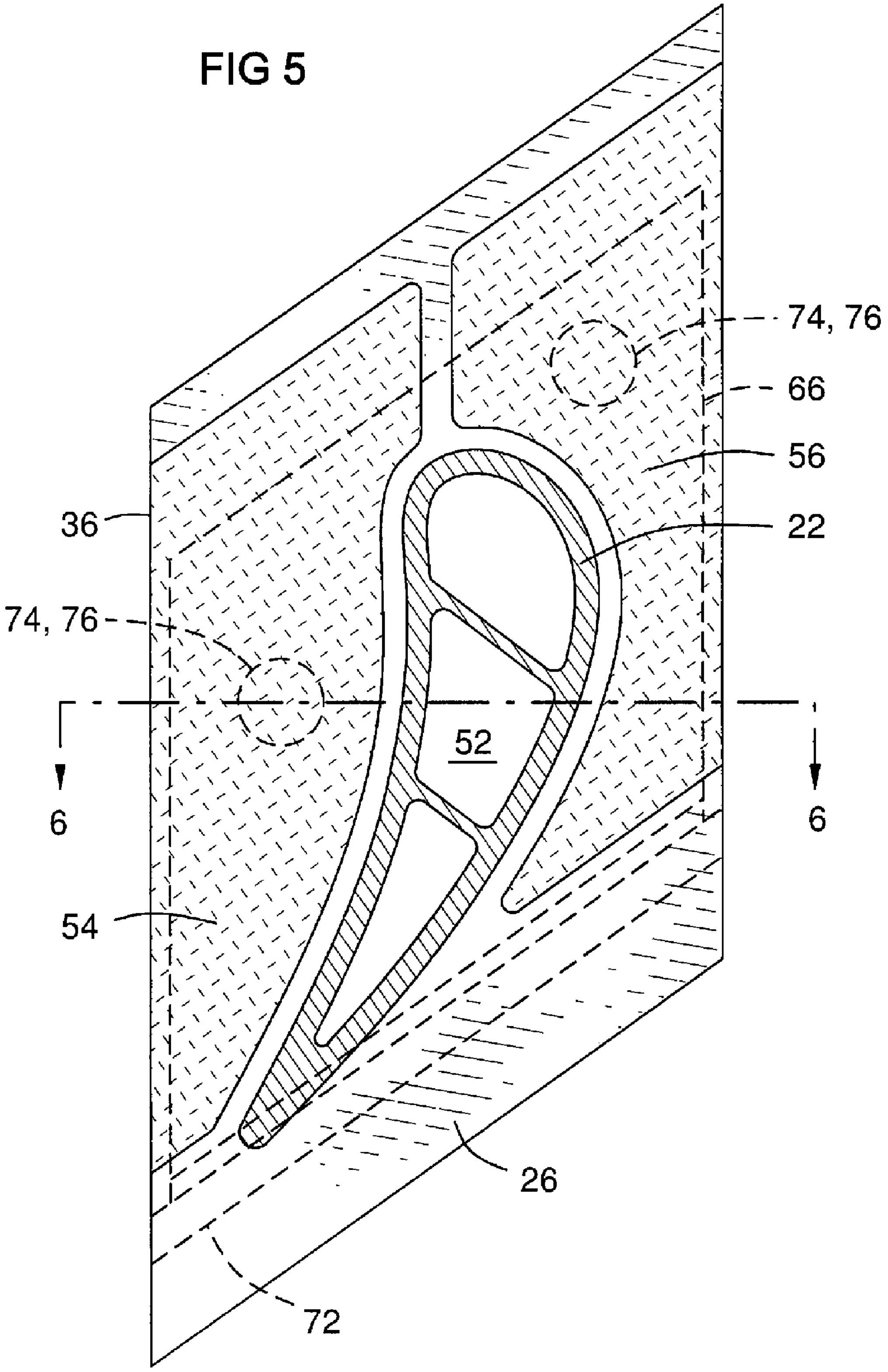
FIG. 5 is a sectional view through the vane of FIG. 1, looking toward the outer vane platform.

FIG. 4 shows two insert plates 54, 56 to be inserted in respective cages 58, 60 in the outer platform 26. Each insert 54, 56 has a working gas face 55, 57 that will become a portion of the working gas face 44 of the outer platform 26. The working gas faces of the inserts and/or other working gas surfaces of the vane and platforms may be coated with a protective coating, such as a thermal barrier coating 86 as known in the art. The inserts 54, 56 are slidably inserted 61 into the cages 58, 60 from the circumferential sides 36, 38 of the platform up to the respective pressure and suction sides 32, 34 of the vane airfoil 22. The inserts 54, 56 may each have a proximal edge 62, 64 that is curved to match the sectional profile 30 of the respective pressure and suction sides 32, 34 of the vane airfoil. Each insert plate 54, 56 may have a recessed track 84 on its circumferential edge that forms a portion of the seal slot 49.

A retainer 66 is attached to the cooled face 48 of the vane platform 26. For example, the retainer 66 may be attached by bolts 68 through holes 70, 71 in the retainer to a vane carrier attachment flange 72, or by another attachment mechanism. The retainer 66 contacts each insert 54, 56 to prevent sliding of the insert in its cage 58, 60. The retainer 66 may be formed of a steel or superalloy plate with a protruding lock mechanism 74, 76 (FIG. 6) that contacts each insert 54, 56 to prevent the insert from sliding. For example, the retainer may have protrusions 74 that fit into a depression or cup 76 in each insert 54, 56. The retainer 66 may have a gap or hole 67 for passage of the coolant 50 into the vane channels 52. The retainer may have further cooling holes (not shown) for impingement cooling on the insert plates 54, 56. The retainer may also be configured in a pattern, such as a grid, that would not interrupt coolant supply from impinging on the backside of the insert plates. The retainer may optionally be formed of plural parts. A "superalloy" is a metal alloy optimized for high-temperature operation and durability as known in the art of gas turbine materials science.

Each cage 58, 60 has a working face frame portion 59 and keyways 78 that guide the inserts 54, 56 into and out of the cage. Each insert 54, 56 may have corresponding keys 80 that contact the keyways 78. The keys 80 may be depressed on the working gas side of the inserts as shown, so that the working gas faces 55, 57 of the inserts 54, 56 are flush with the working gas face 44 of the vane platform 26.

The insert plates 54, 56 may be made of a ceramic matrix composite (CMC) material, such as a silicone-carbide CMC. In one embodiment, the inserts can be made of an oxide-based hybrid CMC system, such as disclosed in U.S. Pat. Nos. 6,676,783, 6,641,907, 6,287,511, and 6,013,592. Alternately, the inserts may be made of metal, such as a single crystal advanced alloy. For example, the inserts may be made of the same material as the platform cages 58-60 in which they are received, such as IN939 alloy and ECY768 alloy. The inserts may be made of a material that may or may not have a greater resistance to heat compared to the material of the cages. For example, the inserts 34 may be made from an inexpensive material, so that the cost of a replacement insert would be minimized.

The insert plates 54, 56 are only illustrated on the outer platform 26, but they may also be installed on the inner platform 24. An inner boss or flange such as the illustrated inner flange 51 may be used for attachment of an inner retainer for locking such insert plates on the inner platform. The inserts can be used in selected areas of the inner and/or outer shroud rings 25, 27 where failures or damage has been known to occur, especially in the first row of vanes after the combustor, among other locations. If an insert becomes damaged during engine operation, the insert can be easily replaced, and the platforms 24, 26 and the airfoil 22 can be reused. As a result, the life of the vane/platform assembly is extended. The inserts may be made of refractory materials such as CMC that have a lower thermal conductivity than metal, thus reducing cooling requirements compared to all-metal platforms.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine vane assembly comprising:

first and second protective insert plates installed in a working gas face of a turbine vane platform, and forming replaceable portions of a turbine shroud;

first and second cages in the turbine vane platform that slidably receive the respective first and second protective insert plates from opposite circumferential sides of the platform;

wherein the plates slide into the cages up to the pressure and suction sides of a vane airfoil attached to the turbine vane platform;

each plate comprising a proximal edge shaped to fit the respective pressure and suction side of the vane airfoil; and a retainer releasably attached to a cooled face of the platform, the retainer contacting each protective insert plate with a locking device that prevents sliding of the plate in the respective cage.

2. The gas turbine vane assembly of claim 1, wherein the retainer comprises a steel or superalloy plate releasably attached to a flange on the cooled side of the vane platform.

3. The gas turbine vane assembly of claim 2, wherein the locking device comprises first and second protrusions on the retainer that fit into respective cups in the respective first and second insert plates.

4. The gas turbine vane assembly of claim 2, wherein:

each insert plate comprises a working gas side and a cooled side;

each cage comprises a frame portion that is substantially flush with the working gas face of the vane platform, and each cage further comprises a keyway portion that guides the respective insert plate into the cage;

each insert plate comprises a key portion that slides within the keyway portion, wherein the key portion is recessed on the working gas side of the insert plate to align the working gas side of the insert plate with the working gas face of the vane platform;

each keyway portion surrounds peripheral edges of each respective insert plate in an installed position except along the respective circumferential side of the vane platform; and a seal slot along each circumferential side of each vane platform receives a seal element that seals against an adjacent vane platform in a circular array of like vane platforms.

5. The gas turbine vane assembly of claim 4, wherein each insert plate is formed of a ceramic matrix composite material, and comprises a thermal barrier coating on the working gas side that is substantially flush with the working gas face of the vane platform in the installed position.

6. The gas turbine vane assembly of claim 4, wherein a circumferential edge of each insert plate comprises a recessed track that forms part of the seal slot along each circumferential side of each vane platform.

7. A gas turbine vane assembly comprising:

a first vane platform comprising a working gas face, an opposite cooled face, and first and second circumferential sides that seal against adjacent vane platforms in a circular array of vane platforms;

a vane airfoil comprising a first end attached to the first vane platform, the vane airfoil comprising a pressure side and a suction side;

a first insert plate comprising a proximal edge that generally conforms to a transverse sectional profile of the pressure side of the vane airfoil;

a first cage in the first vane platform on the pressure side of the vane airfoil, the first cage comprising a frame portion on the working gas face and a keyway behind the frame portion, the first cage being open along the first circumferential side of the first vane platform to slidably receive the first insert plate;

a second insert plate comprising a proximal edge that generally conforms to a transverse sectional profile of the suction side of the vane airfoil;

a second cage in the first vane platform on the suction side of the vane airfoil, the second cage comprising a frame portion on the working gas face and a keyway behind the frame portion, the second cage being open along the second circumferential side of the first vane platform to slidably receive the second insert plate;

a retainer plate attached to the cooled face of the first vane platform and contacting the first and second insert plates to retain the insert plates in the cages.

8. The gas turbine vane assembly of claim 7, wherein the retainer comprises a steel or superalloy plate releasably attached to a flange on the cooled face of the vane platform.

9. The gas turbine vane assembly of claim 8, wherein the retainer contacts each insert plate with a locking mechanism comprising first and second protrusions on the retainer that fit into respective cups in the respective first and second insert plates.

10. The gas turbine vane assembly of claim 7, wherein:

each insert plate comprises a working gas side and a cooled side;

each cage comprises a frame portion that is substantially flush with the working gas face of the vane platform, and a keyway portion that guides the insert plate into the cage;

each insert plate comprises a key portion that slides within the keyway portion, wherein the key portion is recessed on the working gas side of the insert plate to align the working gas side of the insert plate substantially flush with the working gas face of the vane platform;

each keyway portion surrounds peripheral edges of each respective insert plate in an installed position except along the respective circumferential side of the vane platform; and a seal slot along each circumferential side of each vane platform receives a seal element that seals against an adjacent vane platform in the circular array of vane platforms.

11. The gas turbine vane assembly of claim 10, wherein each insert plate is formed of a ceramic matrix composite material, and comprises a thermal barrier coating on the working gas side that is substantially flush with the working gas face of the vane platform in the installed position.

12. The gas turbine vane assembly of claim 10, wherein a circumferential edge of each insert plate comprises a recessed track that forms part of the seal slot along each circumferential side of each vane platform.

13. A gas turbine vane assembly, comprising:

first and second insert plates installed in respective first and second cages in a turbine vane platform, the two insert plates forming portions of a working gas face of the vane platform;

wherein the first and second cages slidably receive the respective first and second insert plates from respective first and second circumferential sides of the platform;

wherein the first and second insert plates slide into the first and second cages up to a respective pressure and suction side of a vane airfoil attached to the platform;

wherein the first and second insert plates each comprise a proximal edge shaped to match a transverse sectional profile of the respective pressure and suction sides of the vane airfoil; and a retainer attached to a cooled side of the vane platform opposite the working gas face, the retainer contacting each insert plate to restrain each insert plate from sliding in the respective cage.

14. The gas turbine vane assembly of claim 13, wherein the vane airfoil comprises a vane cooling channel, and wherein the retainer comprises a steel or superalloy plate with a gap or hole therein for passing a cooling fluid from the cooled side of the vane platform into the vane cooling channel.

* * * * *